United States Patent
Horiuchi et al.

(10) Patent No.: US 7,310,315 B2
(45) Date of Patent: Dec. 18, 2007

(54) NODE JUDGING METHOD, COMMUNICATION SYSTEM, AND NODE MEASURING APPARATUS

(75) Inventors: Yukio Horiuchi, Kamifukuoka (JP); Masatoshi Suzuki, Kamifukuoka (JP)

(73) Assignee: KDDI Corporation, Tokyo (JP)

( * ) Notice: Subject to any disclaimer, the term of this patent is extended or adjusted under 35 U.S.C. 154(b) by 1121 days.

(21) Appl. No.: 10/302,475

(22) Filed: Nov. 21, 2002

(65) Prior Publication Data

US 2003/0095577 A1 May 22, 2003

(30) Foreign Application Priority Data

Nov. 22, 2001 (JP) .............................. 2001-357010

(51) Int. Cl.
*H04L 12/26* (2006.01)

(52) U.S. Cl. ....................... 370/241; 370/242; 370/250

(58) Field of Classification Search ......... 370/241–253
See application file for complete search history.

(56) References Cited

U.S. PATENT DOCUMENTS

| | | | |
|---|---|---|---|
| 6,333,915 B1 * | 12/2001 | Fujita ........................ 370/223 |
| 6,534,997 B1 * | 3/2003 | Horishita et al. ............ 324/534 |
| 6,700,872 B1 * | 3/2004 | Hann et al. .................. 370/241 |
| 6,735,396 B2 * | 5/2004 | Poustie ........................ 398/155 |
| 6,859,041 B2 * | 2/2005 | Styles ......................... 324/523 |
| 6,934,655 B2 * | 8/2005 | Jones et al. .................. 702/108 |
| 7,151,819 B2 * | 12/2006 | Zellner et al. ............ 379/27.03 |

* cited by examiner

*Primary Examiner*—Wing Chan
*Assistant Examiner*—Mark A. Mais
(74) *Attorney, Agent, or Firm*—Christie, Parker & Hale, LLP

(57) ABSTRACT

In a communication system wherein a station transceiver and a plurality of nodes communicate in a TDM system through a signal transmission line, at least a part of the line is shared, a method to judge nodes performing normal operation from the station transceiver comprises a request step to request a return of a test pattern by transmitting a trigger signal for a designated node in the plurality of nodes, a correlation process step to process correlation between a received signal in a timeslot assigned to the designated node and a reference pattern corresponding to the designated node, and a judging step to judge whether the designated node is a normal node according to the correlation process result.

10 Claims, 7 Drawing Sheets

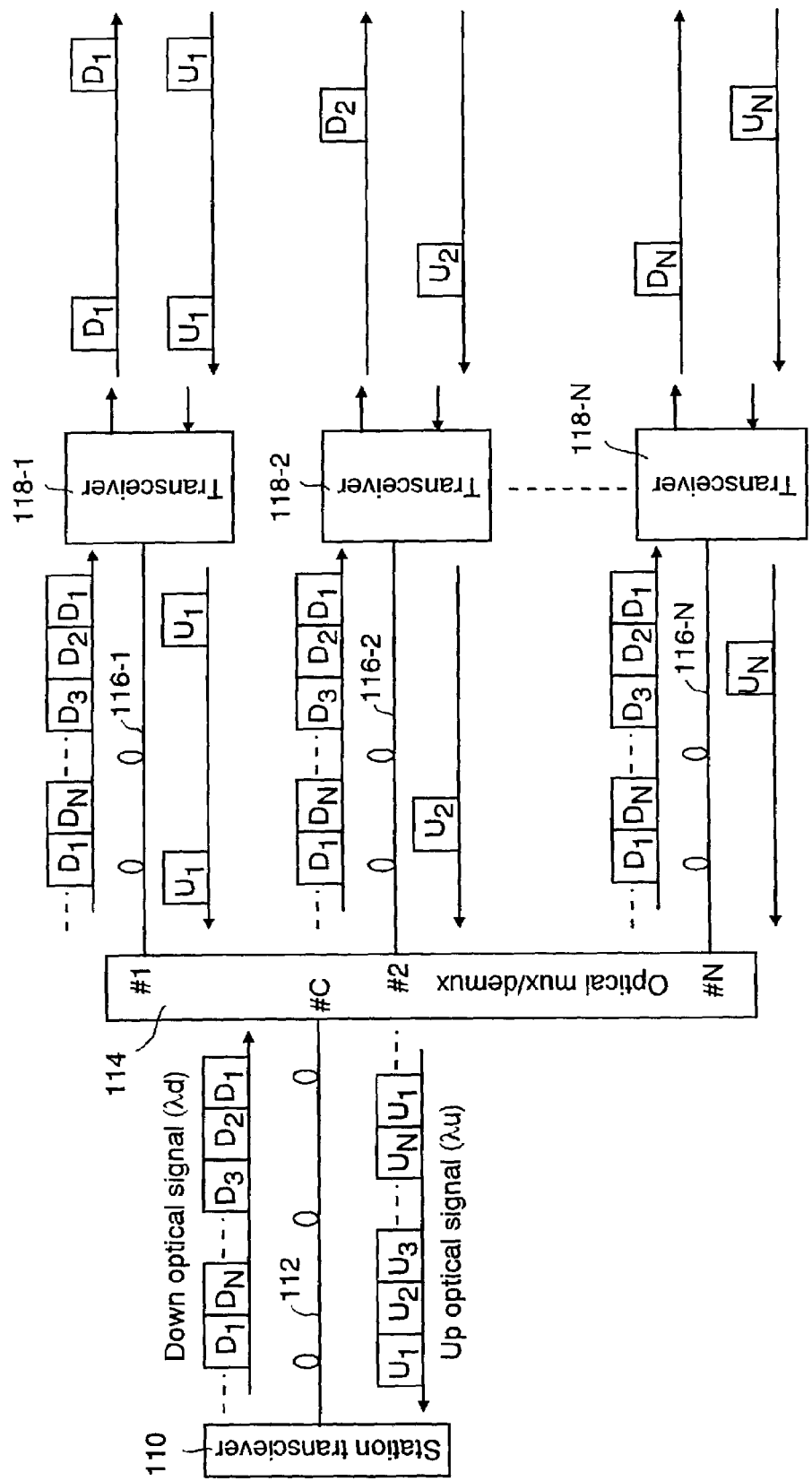

NODE JUDGING METHOD, COMMUNICATION SYSTEM, AND NODE MEASURING APPARATUS

CROSS REFERENCE TO RELATED APPLICATIONS

This application claims priority to Japanese Patent Application No. 2001-357010, filed on Nov. 22, 2001, the entire contents of which are incorporated herein by reference.

FIELD OF THE INVENTION

This invention generally relates to a node judging method, a communication system, and a node measuring apparatus, and more specifically relates to a method for detecting a disturbing node and its communication system, and a node measuring apparatus for detecting the disturbing node.

BACKGROUND OF THE INVENTION

FIG. 7 shows a schematic diagram of a passive optical subscriber network of TDM (time division multiplexing) system, which connects a single station transceiver and a plurality of subscriber nodes.

A station transceiver 110 connects to a common port #C of optical multiplexer/demultiplexer 114 through an optical fiber 112. The optical multiplexer/demultiplexer 114 comprises an optical element to demultiplex an input light from the common port #C into N portions and output each demultiplexed light through ports #1~#N, and to multiplex input light from each of the ports #1~#N and output the multiplexed light through the common port #C. Each of the ports #1~#N of the optical multiplexer/demultiplexer 114 connects to each of optical transceivers 118-1~118-N belonging to respective subscribers #1~#N via optical fibers 116-1~116-N.

A TDM system is used for the communication between the station transceiver 110 and each of the optical transceivers 118-1~118-N belonging to the subscribers #1~#N respectively. Namely, each of the optical transceivers 118-1~118-N extracts a signal in a timeslot assigned for itself out of the time division multiplexed signals (down signal) from the station transceiver 110, receives the extracted signal, and discards the rest of the optical signals in the other timeslots. Each of the optical transceivers 118-1~118-N also outputs a signal to be transmitted for the station transceiver 110 onto the respective optical fibers 116-1~116-N at timing according to its own assigned timeslot. The station transceiver 110 predeterminedly and -continuously synchronizes the station transceiver 110 and the optical transceivers 118-1~118-N. By this operation, each of the optical transceivers 118-1~118-N is able to know the timing of its assigned timeslot for transmission and reception. Description for the synchronizing procedure between the station transceiver 110 and the optical transceivers 118-1~118-N is omitted here.

Used as a down signal to transmit from the station transceiver 110 to the optical transceivers 118-1~118-N belonging to the respective subscribers #1~#N and an up signal from the optical transceivers 118-1~118-N belonging to the respective subscribers #1~#N to the station transceiver 110 are optical carriers having a wavelength different from each other. In a conventional system, a 1.5 μm band optical carrier is used for the down signal and a 1.3 μm band optical carrier is used for the up signal.

The operation of a conventional system is explained below. The station transceiver 110 time-division-multiplexes a down optical signal Di (i=1~N) destined for the respective subscribers #1~#N and outputs the down optical signal Di onto the optical fiber 112. The down optical signal Di propagates on the optical fiber 112 and enters a common port #C of the optical multiplexer/demultiplexer 114. The optical multiplexer/demultiplexer 114 divides the time-division-multiplexed down optical signal Di into N portions and outputs each divided light onto the optical fibers 116-1~116-N through the ports #1~#N. Formatively, all the down optical signals D1-DN destined for the respective subscribers #1~#N enter every one of the transceivers 118-1~118-N. Each of the optical transceivers 118-1~118-N extracts an optical signal in a timeslot assigned for itself out of the input optical signals, receives the extracted signal, and discards the rest of the optical signals in the other timeslots. For instance, the optical transceiver 118-1 exclusively receives a down optical signal D1, and the optical transceiver 118-2 exclusively receives a down optical signal D2.

Each of the optical transceivers 118-1~118-N outputs an up optical signal Ui (i=1~N) according to its own assigned timeslot onto the optical fibers 116-1~116-N. The up optical signal Ui (i=1~N) propagates on the optical fibers 116-1~116-N and enters the ports #1~#N of the optical multiplexer/demultiplexer 114 respectively. The optical multiplexer/demultiplexer 114 multiplexes the respective up optical signals Ui (i=1~N) from the optical fibers 116-1~116-N) and outputs the multiplexed up optical signal onto the optical fiber 112 through the common port #C.

When the optical transceivers 118-1~118-N output the optical signal Ui (i=1~N) onto the optical fibers 116-1~116-N in the respective assigned appropriate timeslots, the up optical signals Ui on the optical fiber 112 are located on proper timeslots not overlapping each other in the time domain, as shown in FIG. 7. That is, the optical multiplexer/demultiplexer 114 multiplexes the respective up optical signals Ui without adjusting their time locations.

The up optical signal Ui being output onto the optical fibers 112 from the optical multiplexer/demultiplexer 114 transmits on the optical fiber 112 and enters the station transceiver 110. Since the station transceiver 110 synchronizes with each of the optical transceivers 118-1~118-N, it can accurately separate each up optical signal Ui out of the input optical signals from the optical fiber 112.

In the above-described passive optical subscriber network, a plurality of subscribers shares one signal band in the time domain. Therefore, when one of the subscribers' units outputs an up optical signal in a timeslot other than the one assigned to itself due to some fault, the other subscriber's communication originally using the mistaken timeslot is inhibited.

For instance, supposing that the optical transceiver 118-1 outputs a continuous disturbance light onto the optical fiber 116-1, this disturbance light extremely deteriorates a signal-to-noise power ratio (SNR) of the up optical signals U2~UN, which are output for the station transceiver 110 by the other optical transceivers 118-2~118-N, on the optical fiber 112. This inhibits signal transmission from the optical transceivers 118-2-118-N to the station transceiver 110. This kind of situation can occur when a subscriber connects to a wrong communication device by mistake or a subscriber maliciously outputs an up optical signal that is not permitted.

When this type of fault occurs, it is most important to eliminate the fault factor as soon as possible. In particular, when the disturbance optical signal is transmitted continuously, all the subscribers' signals are interrupted and thus it is desirable to quickly solve the problem. However, conventionally, to identify the optical transceiver outputting the disturbance light out of all the optical transceivers 118-1˜118-N was impossible and thus there was no way but to check every transceiver one by one.

SUMMARY OF THE INVENTION

A node judging method according to the present invention is a method to judge nodes of normal performance from a station transceiver side in a communication system wherein the station transceiver and a plurality of nodes communicate in a TDM system through a signal transmission line in which at least a part of the line is shared and comprises a request step to request a return of a test pattern by transmitting a trigger signal for a designated node in the plurality of nodes, a correlation process step to process correlation between a received signal in a timeslot assigned to the designated node and a reference pattern corresponding to the designated node, and a judging step to judge whether the designated node is a disturbance node according to the correlation process result.

A communication system according to the present invention is a system wherein a station transceiver and a plurality of nodes communicate in a TDM system through a signal transmission line in which at least a part of the line is shared, and is characterized in that the station transceiver comprises a trigger signal transmitter to transmit a trigger signal including a synchronous pattern signal for the designated node, a reference pattern generator to generate a reference pattern corresponding to the designated node, a correlation processor to process correlation between a received signal in a timeslot assigned to the designated node and the reference pattern, and a judging apparatus to judge whether the designated node is a normal node according to a correlation processed result by the correlation processor and each of the plurality of nodes comprises an apparatus to output a predetermined test pattern signal according to the trigger signal.

A node measuring apparatus according to the present invention comprises a trigger transmitter to transmit a trigger signal for a designated node in the plurality of nodes to request the designated node to return a test pattern signal, a reference pattern generator to generate a reference pattern corresponding to the designated node, correlation processor to process correlation between a received signal in a timeslot assigned to the designated node and the reference pattern, and a judging apparatus to judge whether the designated node is a normal node according to the correlation process result from the correlation processor.

BRIEF DESCRIPTION OF THE DRAWING

The above and other objects, features and advantages of the present invention will be apparent from the following detailed description of the preferred embodiments of the invention in conjunction with the accompanying drawings, in which:

FIG. 7 is a schematic block diagram of a passive optical subscriber network of a conventional TDM (time division multiplexing) system.

DETAILED DESCRIPTION

Embodiments of the invention are explained below in detail with reference to the drawings.

Figure 1:
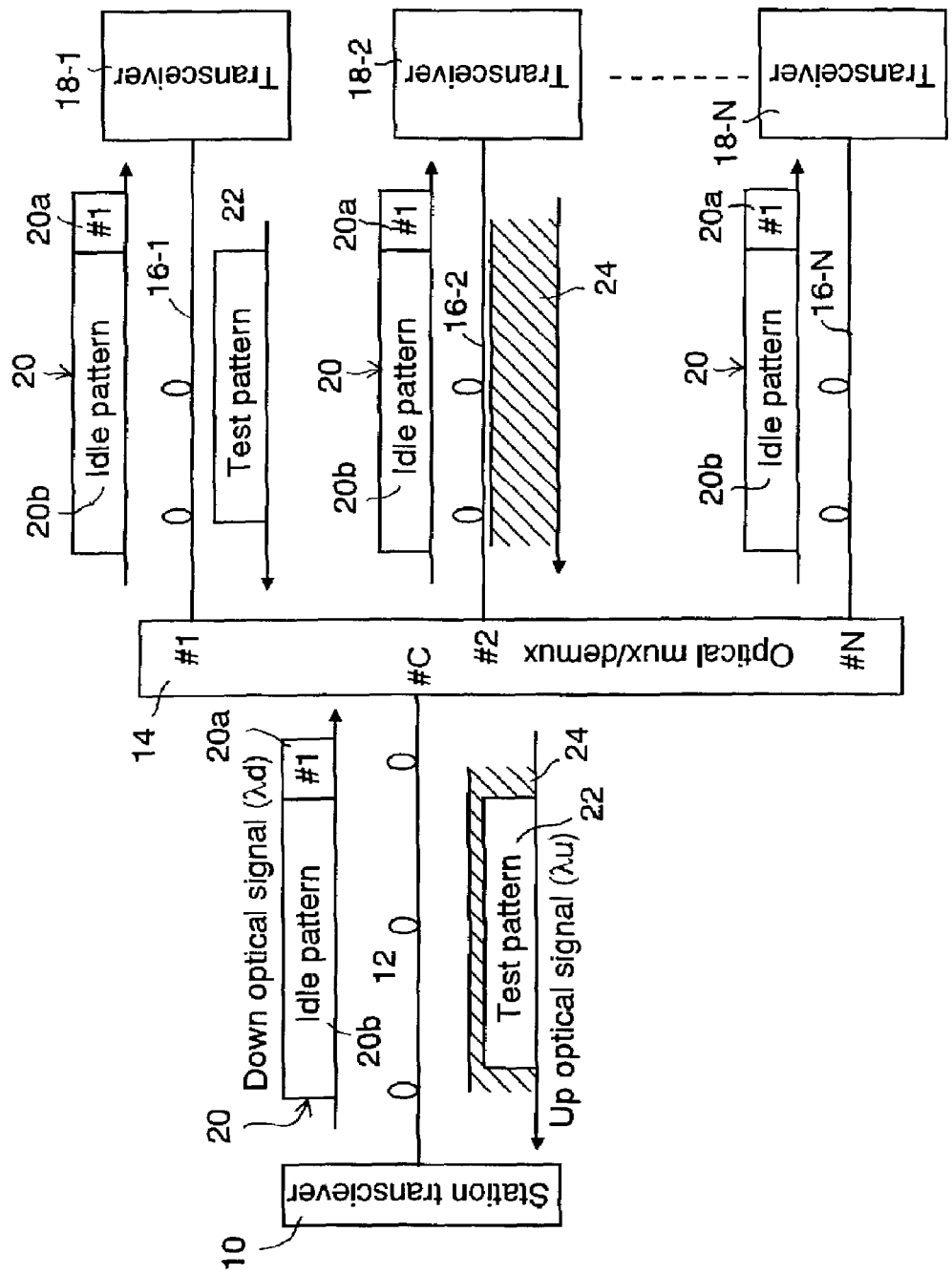
FIG. 1 is a schematic block diagram of an embodiment according to the present invention.

FIG. 1 is a schematic block diagram of an embodiment of the present invention.

A station transceiver 10 connects to a common port #C of an optical multiplexer/demultiplexer 14 through an optical fiber 12. The optical multiplexer/demultiplexer 14 comprises an optical element to divide an input light received through the common port #C into N portions and output each divided light for ports #1~#N, and to multiplex input lights from the ports #1~#N and output through the common port #C. The ports #1~#N of the optical multiplexer/demultiplexer 14 connect to optical transceivers 18-1~18-N belonging to respective subscribers #1~#N through optical fibers 16-1~16-N respectively.

Communication between the station transceiver 10 and the optical transceivers 18-1~18-N of the subscribers #1~#N is identical to that of the conventional system shown in FIG. 7. That is, a TDM system is used in communication between a station transceiver 10 and the optical transceivers 18-1~18-N belonging to the subscribers #1~#N, and an up signal and a down signal is distinguished by a wavelength of an optical carrier to be used. In this embodiment, an optical carrier of wavelength $\lambda d$ is used for the down signal from the station transceiver 10 to the optical transceivers 18-1~18-N belonging to the respective subscribers #1~#N, and an optical carrier of wavelength $\lambda u$ different than the wavelength $\lambda d$ is used for the up signal from the optical transceivers 18-1~18-N of the respective subscribers #1~#N to the station transceiver 10. Similarly to the conventional system, $\lambda d$ is 1.5 μm band and $\lambda u$ is 1.3 μm.

In FIG. 1, the transceiver 18-2 plays a role of a disturbance node to regularly output disturbance lights onto the optical fiber 16-2. The operation of this embodiment to identify the disturbance node (the optical transceiver 18-2) is explained below in detail.

The station transceiver 10 comprises a node measuring apparatus to measure disturbance nodes and fault occurrences. In the explanation below, the operation of the station transceiver 10 to measure whether a node is normal or not is the operation of the node measuring apparatus built in the station transceiver 10.

First, the station transceiver 10 instructs all the optical transceivers 18-1~18-N to be tested or one or some of the test objects to shift to a test mode.

The station transceiver 10 periodically outputs an optical trigger signal 20 (wavelength $\mu d$) for the optical fiber 12 so that the respective optical transceivers 18-1~18-N transmit a test pattern according to the predetermined timing. The optical trigger signal 20 comprises a node designator 20a that designates an optical transceiver to return a test pattern and an idle pattern signal 20b to synchronize the object optical transceiver with the station transceiver 10. The node designator 20a can designate a single specific one of the optical transceivers 18-1~18-N and also can specify all the optical transceivers 18-1~18-N at once. In FIG. 1, the node designator 20a designates the optical transceiver 18-1. The idle pattern signal 20b can be identical to the test pattern to be returned from the optical transceivers 18-1~18-N and also can be a fixed pattern made from a constant repetition of mark and space.

An optical multiplexer/demultiplexer 14 divides the optical trigger signal 20 input from the station transceiver 10 through the optical fiber 12 into N portions and outputs the respective divided light for the optical transceivers 18-1~18-N through the optical fibers 16-1~16-N. Only the optical transceiver 18-1 designated by the node designator 20a in the optical trigger signal 20 outputs a test pattern optical signal 22 onto the optical fiber 16-1. At this time, the optical transceiver 18-1 synchronizes with an idle pattern signal 20b in the input optical trigger signal 20 and outputs an optical test pattern signal 22 (wavelength λu) for the optical fiber 16-1. Through this operation, the synchronization between the station transceiver 10 and the optical transceiver 18-1 is confirmed.

The test pattern carried by the test pattern optical signal 22 (wavelength λu) can be any pattern as far as the station transceiver 10 recognizes it. For instance, it can be identical to the idle pattern 20b or an encoded idle pattern and also can be identical or different in the respective optical transceivers 18-1~18-N. However, it is preferable that the test pattern comprises a pseudo random pattern.

When all the optical transceivers 18-1~18-N are tested at the same time, it is preferable that the optical transceivers 18-1~18-N return a test pattern optical signal comprising a pattern different from each other to the station transceiver 10. Because, when two or more of the optical transceivers are located the same distance from the station transceiver 10, the station transceiver 10 cannot detect the test pattern optical signals from those transceivers individually even if it uses a correlation method to be described later.

When a single optical transceiver is tested one by one, each of the optical transceivers 18-1~18-N can either return the same test pattern optical signal 22 to the station transceiver 10 or return a test pattern optical signal 22 different from each other to the station transceiver 10.

The test pattern optical signal 22 being output from the optical transceiver 18-1 propagates on the optical fiber 16-1 and enters the optical multiplexer/demultiplexer 14. Also, the disturbance light 24 (wavelength λu) being output from the optical transceiver 18-2 onto the optical fiber 16-2 propagates on the optical fiber 16-2 and enters the optical multiplexer/demultiplexer 14. The optical multiplexer/demultiplexer 14 applies its test pattern optical signal 22 (wavelength ku) and the disturbance light 24 (wavelength λu) to the station transceiver 10 through the optical fiber 12. On the optical fiber 12, an SNR of the test pattern optical 22 greatly deteriorates due to the disturbance light 24.

The station transceiver 10 converts the light consisted of the test pattern optical signal 22 and the disturbance light 24 input from the optical fiber 12 to an electric signal, processes the correlation between the output and the reference pattern, and integrates the correlation result. The reference pattern comprises a pattern identical to the test pattern carried by the test pattern optical signal 22. From this correlation process, the test pattern optical signal 22 can be detected. Even when the SNR of the test pattern optical signal 22 is greatly deteriorated, the test pattern optical signal 22 can be certainly detected by integrating the correlation result.

Although the details are described later, when the test pattern is detected, the reference pattern is applied to a correlation process circuit after the trigger optical signal 20 is output onto the optical fiber 12, the time lag equals to the time needed for the roundtrip distance between the optical transceiver to be tested (here, the apparatus 18-1) and the station transceiver 10 plus the return time in the apparatus 18-1. By applying the reference pattern to the correlation process circuit at the timing where the test pattern does not exist, a cross-correlation value with the signal input from the optical fiber 12 can be calculated. This cross-correlation value shows an index of background noise.

If the integration value of the correlation result is larger than the predetermined value, it proves that the subject optical transceiver being tested is normally operated. The station transceiver 10 outputs the trigger optical signal 20 on to the optical fiber 12 taking a next optical transceiver, for instance the apparatus 18-2, as a testing object. According to this manner, the station transceiver 10 tests each of the optical transceivers 18-1~18-N one by one.

The optical transceiver 18-2 outputting the disturbance light 24 does not send a test pattern optical signal in return to the trigger optical signal 20. Therefore, when the optical transceiver 18-2 has been tested, the integration value of correlation process in the station transceiver 10 is lower than the predetermined value. From this, it is clear that the station transceiver 10 recognizes a fault in the optical transceiver 18-2.

When each of the optical transceivers 18-1~18-N outputs a test pattern optical signal different from each other, the station transceiver 10 can identify an optical transceiver having a fault, e.g. fault node, quicker by performing correlation process in parallel. Needless to say, the station transceiver 10 can perform correlation process of the test pattern optical signal from each of the optical transceivers 18-1~18-N sequentially. This requires less time to identify the fault node compared to the method that outputs the trigger optical signal 20 for the optical transceivers 18-1~18-N individually.

Generally, when a disturbance light exists, it is expected that all the up signals are being disturbed. However, sometimes it happens that a disturbance light is transmitted in a timeslot other than the predetermined timeslot due to a defect of timing circuits etc. In this case, the transmission timing is likely to have periodicity, and thus although it affects one or some of other subscribers, it does not affect the communication of the rest of the subscribers. Under the circumstance, to avoid the influence to the nodes performing normal communication, the above detecting process is performed in the situation that only the node having communication fault is enforced to send test pattern data instead of communication data for a station to which the node having fault has been assigned. In this case, it is necessary to perform integral process only when the test pattern data exists.

Figure 2:
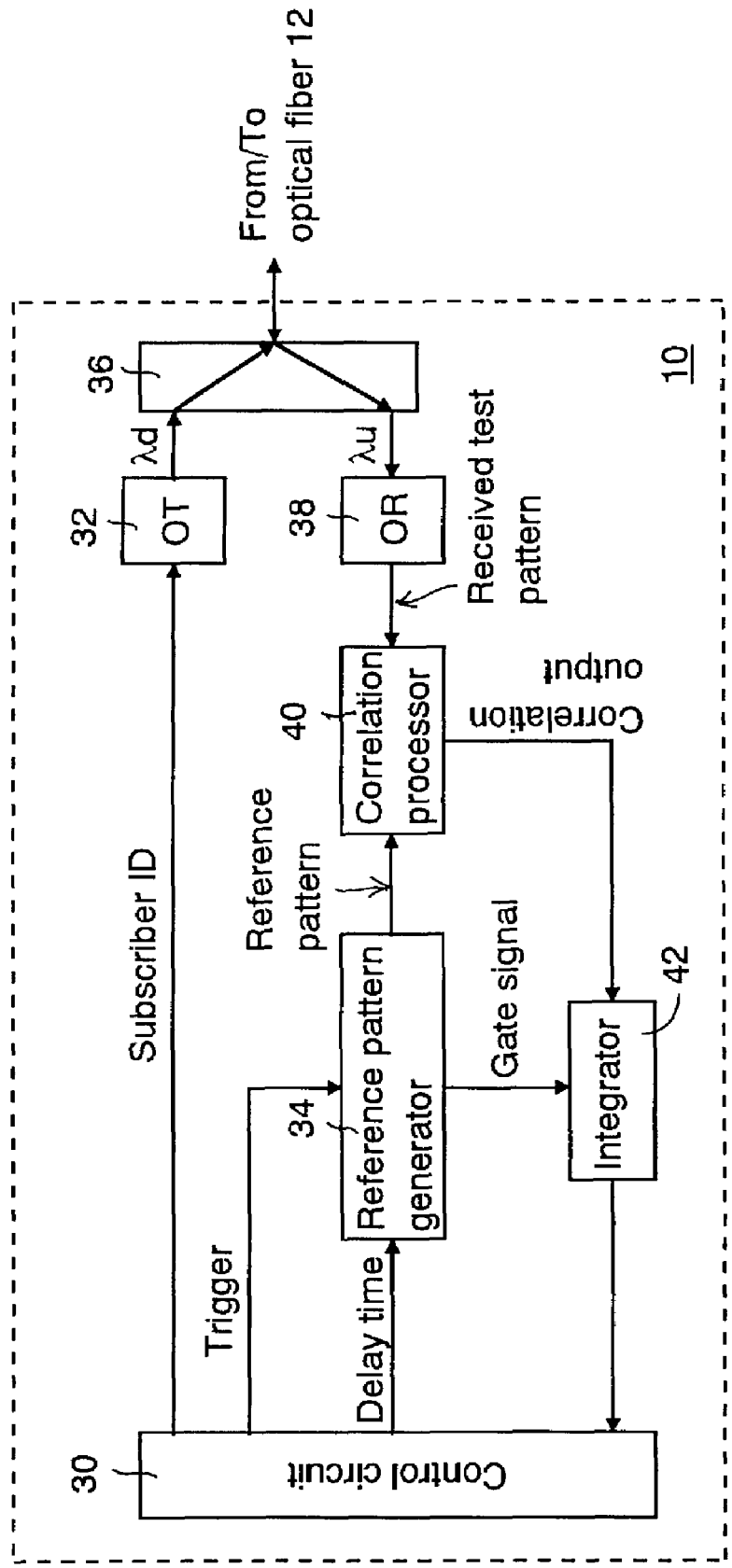
FIG. 2 is a schematic block diagram of a station transceiver 10.

The internal configuration of the station transceiver 10 is explained below. FIG. 2 shows a schematic block diagram of an embodiment of the station transceiver 10. However, it mainly shows a configuration of a node measuring apparatus to measure whether the transceivers 18-1~18-N operate normally. A control circuit 30 applies a subscriber ID to identify an optical transceiver to be tested and idle pattern to an optical transmitter 32 and applies a trigger signal and delay time obtained by considering roundtrip distance between the optical transceiver to be tested and the station transceiver 10 to a reference pattern generating circuit 34.

The optical transmitter 32 converts the subscriber ID and idle pattern signal into an optical signal of wavelength λd to generate a trigger optical signal 20 whose retrieval object is identified by the subscriber ID. The trigger optical signal 20 is applied to the optical fiber 12 through a WDM optical multiplexer/demultiplexer 36 and sent for the optical transceivers 18-1~18-N as previously explained.

The WDM optical multiplexer/demultiplexer 36 is a wavelength-selective optical coupler to couple the λd light output from the optical transmitter 32 to the optical fiber 12 and input the light of wavelength λu from the optical fiber 12 to an optical receiver 58.

The WDM optical multiplexer/demultiplexer 36 applies the light of wavelength λu including the test pattern optical signal 22 and disturbance light 24 from the optical fiber 12 into the optical receiver 38. The optical receiver 38 converts the input light into an electric signal and forwards the converted electrical signal to a correlation processor 40. A test pattern carried by the test pattern optical signal 22 enters the correlation processor 40.

On the other hand, the reference pattern generator 34 generates a reference pattern when the delay time set by the controller 30 passed from inputting the trigger signal from the controller 30 and applies the reference pattern to the correlation processor 40. The reference pattern generator 34 also applies a gate signal to the integrator 42, the gate signal showing a timeslot used by the optical transceiver to output a test pattern optical signal for the correlation result from the correlation processor 40. The gate signal shows the timing to integrate the correlation process result for the test pattern signal from the tested optical transceiver.

The correlation processor 40 processes the correlation between the received test pattern from the optical receiver 38 and the reference pattern from the reference pattern generator 34 and applies the correlation result to the integrator 42. The integrator 42 integrates the correlation result from the correlation processor 40 in a timeslot assigned by the gate signal from the reference pattern generator 34.

The controller 30 specifies one or more optical transceivers generating the disturbance light according to the integration result for each of the optical transceivers 18-1~18-N by the integrator 42.

Figure 3:
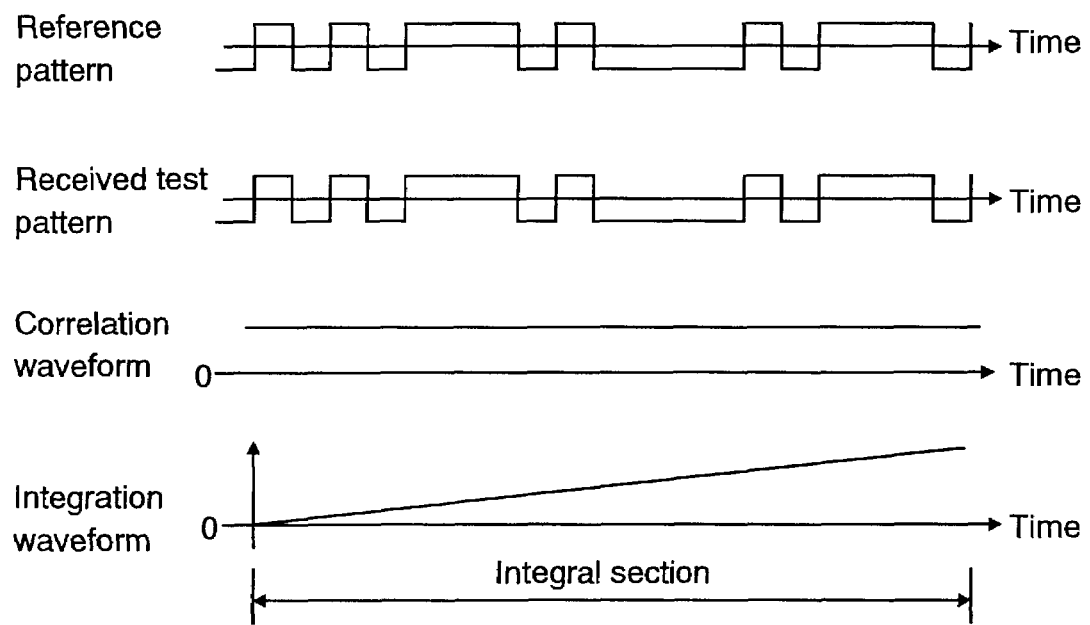
FIG. 3 shows waveform examples of correlation result and integration result when a received test pattern and a reference pattern coincide.
Figure 4:
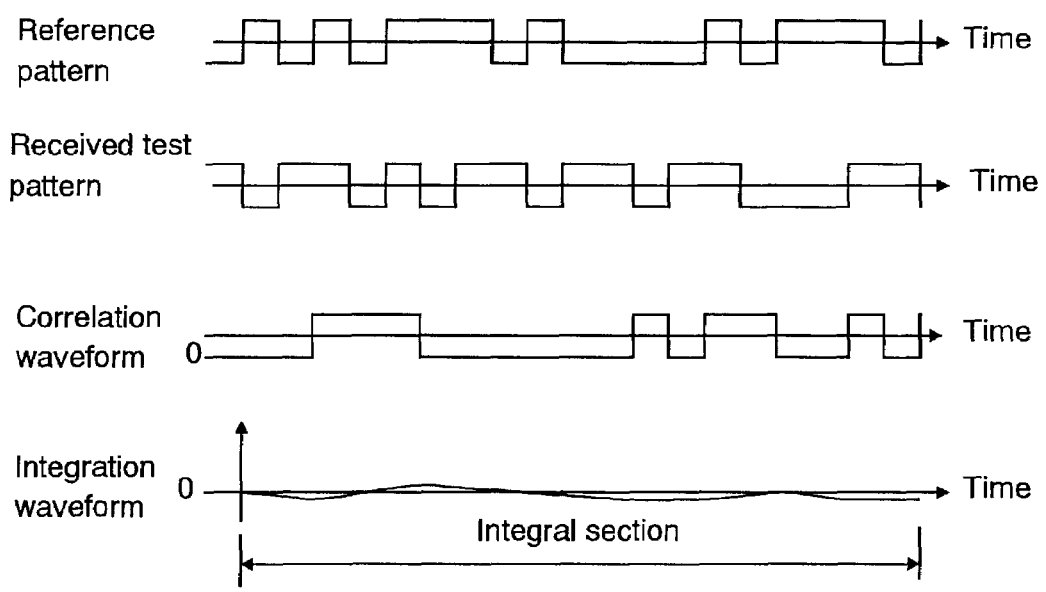
FIG. 4 shows waveform examples of correlation result and integration result when a received test pattern and a reference pattern do not coincide.

FIG. 3 shows resultant waveforms from the correlation process and the integration process when a received test pattern and a reference pattern coincide, and FIG. 4 shows resultant waveforms of the correlation process and integration process when the received test pattern and the reference pattern do not coincide. When the received test pattern and the reference pattern coincide, the integration result of the integrator 42 increases with time. This means that the tested optical transceiver is operating normally and not outputting the disturbance light. Conversely, when the received test pattern and the reference pattern do not coincide, the integration result of the integrator 42 only varies around zero value or within minus values. This means that the tested optical transceiver is not operating normally and outputting the disturbance light. As described above, it is possible to judge whether the tested optical transceiver is operating normally or not, namely outputting disturbance light or not, according to the integration result output from the integrator 42.

When the reference pattern generator 34, correlation processor 40, and integrator 42 are designed as a digital processor, an analog/digital (A/D) converter should be disposed between the optical receiver 38 and the correlation processor 40.

As explained above, the disturbance node can be specified more quickly owing to the configuration in which the test pattern optical signals are output in the timeslots assigned respectively by the plurality of optical transceivers 18-1~18-N, and the station transceiver 10 performs the correlation process on the plurality of received test pattern signals simultaneously.

Figure 5:
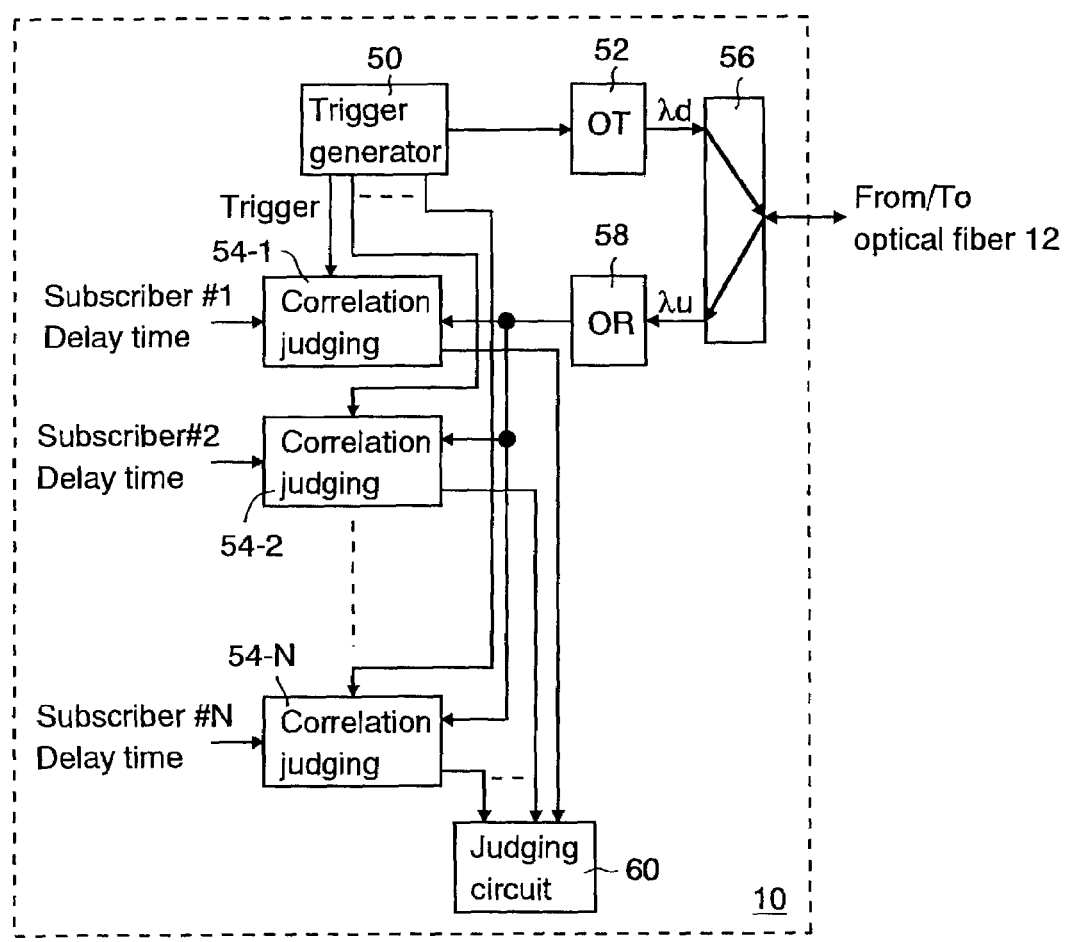
FIG. 5 is a schematic block diagram of another configuration example of the station transceiver 10.

FIG. 5 shows a schematic block diagram of an embodiment of the station transceiver 10 to perform parallel processing of a plurality of received test pattern signals.

A trigger generator 50 applies an identifier to show all or some of the optical transceivers 18-1~18-N and an idle pattern to an optical transmitter 52. The optical transmitter 52 generates a trigger optical signal 20 (wavelength λd) to be broadcast or multicast to all or some of the optical transceivers 18-1~18-N, and, at the same time, the trigger generator 50 applies a trigger signal to provide test-start timing information to the correlation judging circuits 54-1~54-N to judge correlation of the test patterns returned from each of the optical transceivers 18-1~18-N. Delay time is applied to each of the correlation judging circuits 54-1~54-N, each delay time is determined considering roundtrip distance from the station transceiver 10 to the corresponding optical transceivers 18-1~18-N. The trigger optical signal 20 (wavelength λd) generated by the optical transmitter 52 is applied to the optical fiber 12 through the WDM optical multiplexer/demultiplexer 56 and, as previously explained, enters the optical transceivers 18-1~18-N. The WDM optical multiplexer/demultiplexer 56 comprises an optical element identical to the WDM multiplexer/demultiplexer 36.

The WDM optical multiplexer/demultiplexer 56 applies the light of wavelength λu from the optical fiber 12 to the optical receiver 58. The optical receiver 58 converts the light of wavelength λu from the WDM optical multiplexer/demultiplexer 56 into an electric signal and applies to each of the correlation judging circuits 54-1~54-N. The output from the optical receiver 58 includes the test pattern signal returned from the optical transceiver assigned by the trigger optical signal 20 and the disturbance light from the disturbance node.

Each of the correlation judging circuits 54-1~54-N comprises a configuration identical to the circuit block diagram of the embodiment shown in FIG. 1, which consists of the reference pattern generator 34, the correlation processor 40 and the integrator 42. Performing the same operation as the one explained for the embodiment in FIG. 1, each correlation judging circuit 54-1~54-N judges according to the output from the optical receiver 58 whether the corresponding optical transceiver 18-1~18-N normally returns a test pattern signal. Judged result of each correlation judging circuit 54-1~54-N corresponds to the output from the integrator 42. The judged result of each correlation judging circuit 54-1~54-N is applied to a judging circuit 60. The judging circuit 60 specifies which optical transceiver 18-1~18-N outputs the disturbance signal or light according to the judged output from each correlation judging circuit 54-1~54-N.

In the embodiment shown in FIG. 5, since it is possible to process in parallel the test pattern signals returned from the plurality of optical transceivers 18-1~18-N, the disturbance node can be detected more quickly than when the optical transceivers are tested individually.

In the embodiment shown in FIG. 5, it is also possible to convert the analog output from the optical receiver 38 to a digital signal and to apply the converted digital signal to each correlation judging circuit 54-1~54-N.

Generally, there are two kinds of methods for generating a test pattern signal in each optical transceiver 18-1~18-N. The first method is to return the pattern from the station transceiver 10 as it is or after coding it. In this method, internal configuration of the optical transceiver 18-1~18-N can be simplified. The second method is to use the idle pattern 20b from the station transceiver 10 only for synchronizing with the station transceiver 10 and each optical transceiver 18-1~18-N generates an original test pattern. In this case, each optical transceiver 18-1~18-N requires a pattern generator, and the generated pattern must be identical to the reference pattern generated in the station transceiver 10.

Figure 6:
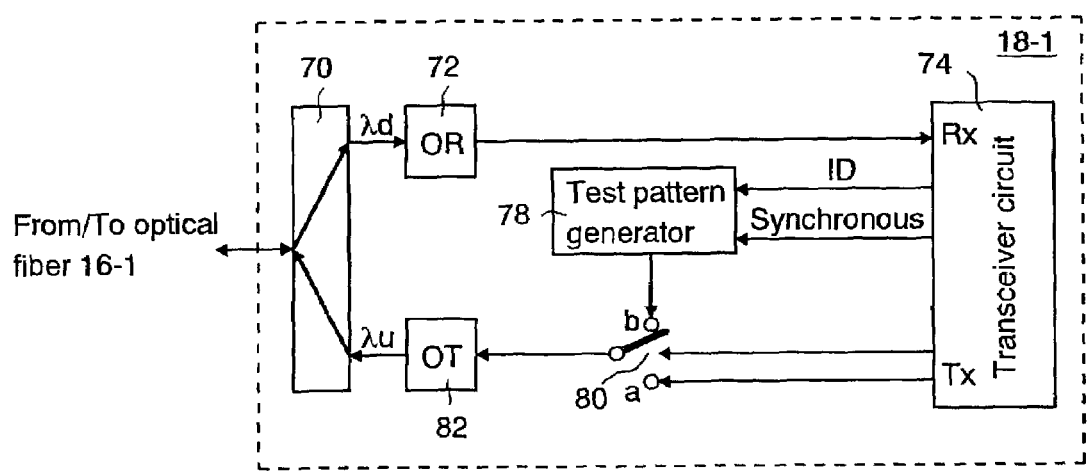
FIG. 6 is a schematic block diagram of an optical transmitter 18-1.
Figure 1:
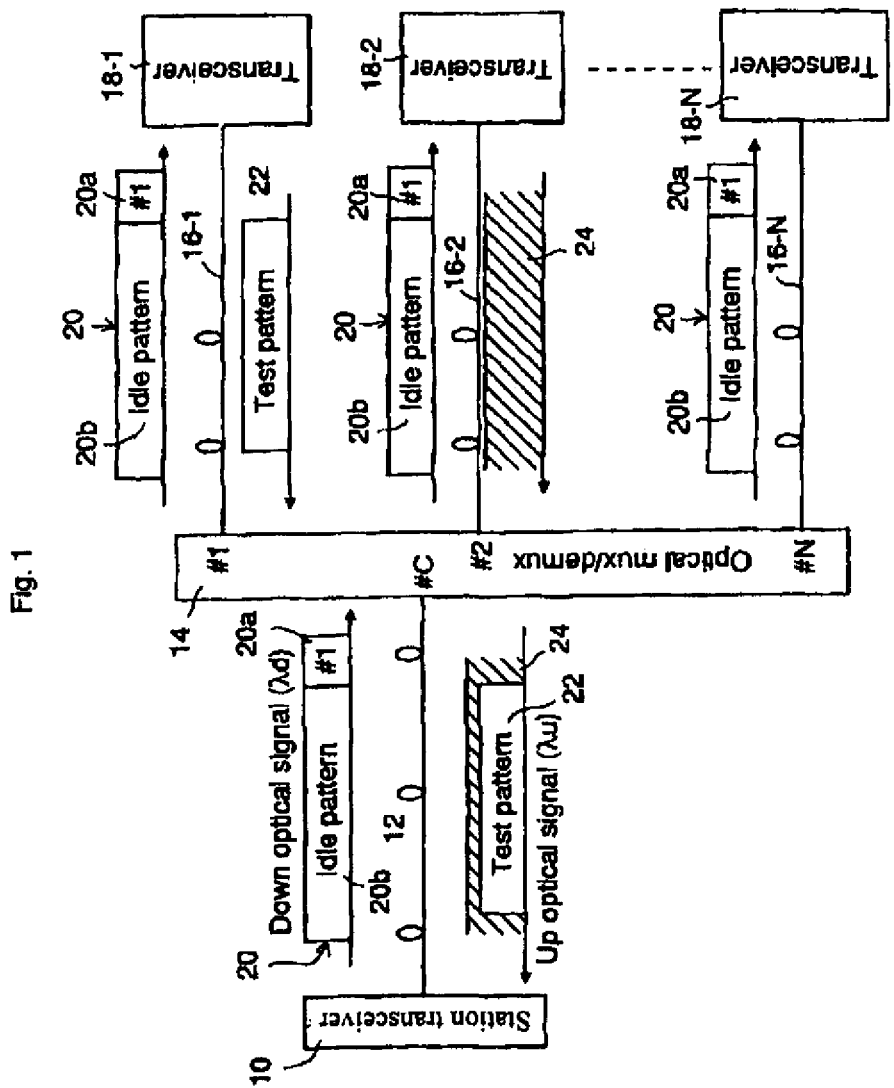

FIG. 6 shows a schematic block diagram of an embodiment of the optical transceiver 18-1 capable of generating an original test pattern. The other optical transceivers 18-2~18-N also have the same configuration.

A WDM optical multiplexer/demultiplexer 70 applies the light input from the optical fiber 16-1 to an optical receiver 72. The optical receiver 72 converts the timeslot part assigned to the optical transceiver 18-1 in the input light into an electric signal and outputs the electrical signal to a transmission/reception circuit 74.

The -transmission/reception circuit 74 transmits/receives data to/from the station transceiver 10 in a communication mode. In test mode, the transmission/reception circuit 74 identifies an ID showing a return test pattern from the signal carried by the optical trigger signal from the station transceiver 10 and applies the ID to the test pattern generator 78. The transmission/reception circuit 74 also applies a synchronous signal for synchronizing the test pattern with the idle pattern to the test pattern generator 78. The test pattern generator 78 generates a test pattern having a pattern-content according to the ID identified by the ID identifier 76 in synchronization with the synchronous signal from the transmission/reception circuit 74 and applies to a b-contact of switch 80.

The transmission/reception circuit 74 also receives control-command for the optical transceiver 18-1 and controls each part of the optical transceiver 18-1 according to the received command. For instance, although a switch 80 normally connects to a-contact (the output of the transmission/reception circuit 74), the transmission/reception circuit 74 connects the switch 80 to the b-contact (the output of the test pattern generator 78) when it receives a command to instruct shifting to the test mode from the station transceiver 10.

The signal selected at the switch 80 is applied to the optical transmitter 82 and converted to an optical signal of wavelength λu. The optical signal (wavelength λu) output from the optical transmitter 82 is transmitted onto the optical fiber 16-1 by the WDM optical multiplexer/demultiplexer 70 and enters the station transceiver 10 through the optical fiber 16-1, the optical multiplexer/demultiplexer 14, and the optical fiber 12.

In the test mode, since the switch 80 connects to the b-contact, the test pattern optical signal 22 carrying the test pattern output from the test pattern generator 78 is transmitted from the optical transceiver 18-1 to the station transceiver 10.

Although explained above is an embodiment in which a node measuring apparatus is built in the station transceiver 10, a configuration such that a node measuring apparatus with the above-described function is disposed outside the station transceiver is obviously applicable.

As readily understandable from the aforementioned explanation, according to the invention, even if communication of a TDM optical network is inhibited due to a fault of a specific node apparatus, it is possible to check normally operating nodes easily and precisely. That is, the node having the fault is identified quickly.

While the invention has been described with reference to the specific embodiment, it will be apparent to those skilled in the art that various changes and modifications can be made to the specific embodiment without departing from the spirit and scope of the invention as defined in the claims.

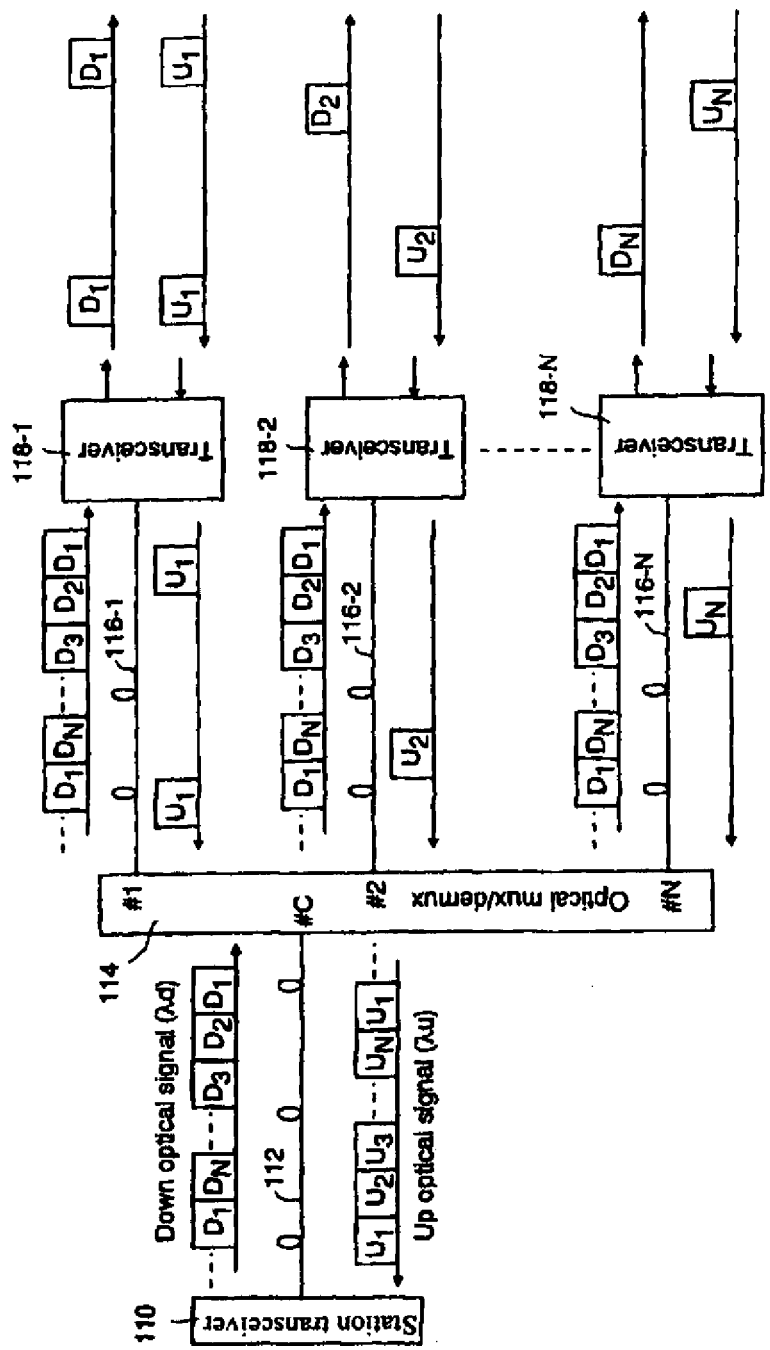

The invention claimed is:

1. In a communication system wherein a station transceiver and a plurality of nodes communicate in a TDM system through a signal transmission line, and wherein at least a part of the line being shared, a method to judge nodes performing normal opening from the station transceiver comprising:
    requesting a return of a test pattern by transmitting a trigger signal including a synchronous pattern signal for a designated node in the plurality of nodes;
    returning by the designated node at test pattern specific to the designated node in synchronization with the trigger signal;
    processing correlation between a received signal in a timeslot assigned to the designated node and a reference pattern corresponding to the designated node; and
    judging whether the designated node is a normal node according to the correlation processing result.

2. The method of claim 1 wherein the correlation processing starts after the transmission of the trigger signal with a time lag corresponding to the roundtrip distance of the signal to the designated node.

3. The method of claim 1 wherein judging whether the designated node is a normal node comprises integrating the correlation process result for a predetermined time and judging whether the designated node is normal node according to the integration result.

4. The method of claim 1 wherein the designated node returns the test pattern signal in a timeslot assigned to the designated node.

5. The method of claim 1 further comprising selecting the designated node sequentially from the plurality of nodes and wherein a return test pattern is individually requested from the designated node.

6. The method of claim 5 wherein each of the plurality of nodes returns a different test pattern responsive to the trigger signal.

7. The method of claim 1 wherein at least two of the nodes are specified and wherein a return of a test pattern is requested from the at least two specified nodes.

8. The method of claim 7 wherein the correlation process between a respective reference pattern and the received signal for the at least two specified nodes are executed in parallel.

9. The method of claim 1 further comprising:
    communicating input signals over a first signal line from the station transceiver to a multiplexer/demultiplexer;
    demultiplexing the input signals received from the station transceiver and communicating said demultiplex input signals to a plurality of node measuring apparatus over a plurality of second signal lines;
    communicating output signals from each of the plurality of nodes to said multiplexer/demultiplexer over the plurality of second signal lines; and
    multiplexing the output signals received from the plurality of nodes and communicating the multiplexed output signals to the station transceiver over the first signal line.

10. The method of claim 9 wherein communicating input and output signals over both of the first signal line and the plurality of second signal lines comprise communicating optical input and output signals over an optical fiber.

* * * * *

UNITED STATES PATENT AND TRADEMARK OFFICE
CERTIFICATE OF CORRECTION

| | | |
|---|---|---|
| PATENT NO. | : 7,310,315 B2 | Page 1 of 4 |
| APPLICATION NO. | : 10/302475 | |
| DATED | : December 18, 2007 | |
| INVENTOR(S) | : Yukio Horiuchi | |

It is certified that error appears in the above-identified patent and that said Letters Patent is hereby corrected as shown below:

The Title Page, showing an illustrative Figure, should be deleted and substitute therefore the attached title page.

In the Drawings

FIG. 1, Sheet 1 of 7     Delete Drawing Sheet 1 and substitute therefore the Drawing Sheet, consisting of Fig. 1, correcting the word "transceiver" in box 10

FIG. 7, Sheet 7 of 7     Delete Drawing Sheet 7 and substitute therefore the Drawing Sheet, consisting of Fig. 7, correcting the word "transceiver" in box 110

Column 10, line 8, claim 1     Delete "opening", Insert --operation--

Column 10, line 13, claim 1     Delete "at", Insert --a--

Column 10, line 28, claim 3     After "is", Insert --a--

Signed and Sealed this

Twenty-second Day of December, 2009

David J. Kappos
*Director of the United States Patent and Trademark Office*

United States Patent
Horiuchi et al.

(10) Patent No.: US 7,310,315 B2
(45) Date of Patent: Dec. 18, 2007

(54) NODE JUDGING METHOD, COMMUNICATION SYSTEM, AND NODE MEASURING APPARATUS

(75) Inventors: Yukio Horiuchi, Kamifukuoka (JP); Masatoshi Suzuki, Kamifukuoka (JP)

(73) Assignee: KDDI Corporation, Tokyo (JP)

(*) Notice: Subject to any disclaimer, the term of this patent is extended or adjusted under 35 U.S.C. 154(b) by 1121 days.

(21) Appl. No.: 10/302,475

(22) Filed: Nov. 21, 2002

(65) Prior Publication Data
US 2003/0095577 A1 May 22, 2003

(30) Foreign Application Priority Data
Nov. 22, 2001 (JP) .................... 2001-357010

(51) Int. Cl.
H04L 12/26 (2006.01)
(52) U.S. Cl. ............... 370/241; 370/242; 370/250
(58) Field of Classification Search ......... 370/241–253
See application file for complete search history.

(56) References Cited

U.S. PATENT DOCUMENTS

| | | | |
|---|---|---|---|
| 6,333,915 B1* | 12/2001 | Fujita | 370/223 |
| 6,534,997 B1* | 3/2003 | Horishita et al. | 324/534 |
| 6,700,872 B1* | 3/2004 | Hann et al. | 370/241 |
| 6,735,396 B2* | 5/2004 | Poustie | 398/155 |
| 6,859,041 B2* | 2/2005 | Styles | 324/523 |
| 6,934,655 B2* | 8/2005 | Jones et al. | 702/108 |
| 7,151,819 B2* | 12/2006 | Zellner et al. | 379/27.03 |

* cited by examiner

Primary Examiner—Wing Chan
Assistant Examiner—Mark A. Mais
(74) Attorney, Agent, or Firm—Christie, Parker & Hale, LLP

(57) ABSTRACT

In a communication system wherein a station transceiver and a plurality of nodes communicate in a TDM system through a signal transmission line, at least a part of the line is shared, a method to judge nodes performing normal operation from the station transceiver comprises a request step to request a return of a test pattern by transmitting a trigger signal for a designated node in the plurality of nodes, a correlation process step to process correlation between a received signal in a timeslot assigned to the designated node and a reference pattern corresponding to the designated node, and a judging step to judge whether the designated node is a normal node according to the correlation process result.

10 Claims, 7 Drawing Sheets

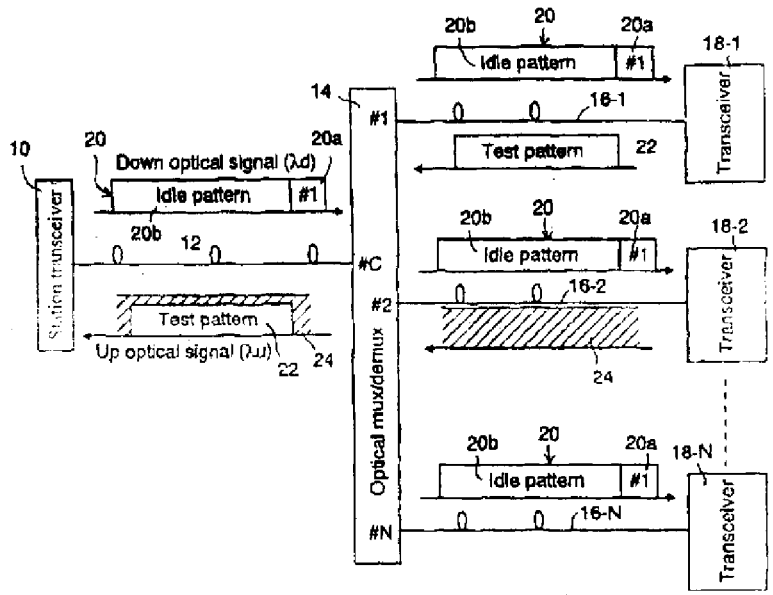

Fig. 1